United States Patent
Lv et al.

(10) Patent No.: US 10,302,348 B2
(45) Date of Patent: May 28, 2019

(54) HEAT INSULATION DOOR AND REFRIGERATION APPLIANCE WITH THE HEAT INSULATION DOOR

(71) Applicant: BSH HAUSGERAETE GMBH, Munich (DE)

(72) Inventors: Ping Lv, Nanjing (CN); Yaoguo Xu, Nanjing (CN); Chuan Zhang, Chuzhou (CN)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 15/835,550

(22) Filed: Dec. 8, 2017

(65) Prior Publication Data

US 2018/0164023 A1 Jun. 14, 2018

(30) Foreign Application Priority Data

Dec. 12, 2016 (CN) .......................... 2016 1 1138455

(51) Int. Cl.
| | |
|---|---|
| A47F 3/04 | (2006.01) |
| F25D 23/02 | (2006.01) |
| F25D 23/08 | (2006.01) |

(52) U.S. Cl.
CPC ............ *F25D 23/02* (2013.01); *A47F 3/0434* (2013.01); *F25D 23/087* (2013.01); *F25D 2201/14* (2013.01); *F25D 2323/023* (2013.01); *F25D 2400/18* (2013.01); *Y02B 40/34* (2013.01)

(58) Field of Classification Search
CPC ....... F25D 23/02; F25D 23/028; A47F 3/0434
See application file for complete search history.

(56) References Cited

U.S. PATENT DOCUMENTS

| | | | | |
|---|---|---|---|---|
| 5,111,618 | A | * | 5/1992 | Kaspar .................... A47F 3/043 49/501 |
| 5,910,083 | A | * | 6/1999 | Richardson ......... E06B 3/66366 312/116 |
| 6,280,826 | B1 | * | 8/2001 | Woll ................. B32B 17/10045 109/49.5 |
| 7,043,886 | B1 | * | 5/2006 | Chubb .................. A47F 3/0434 312/138.1 |
| 2010/0043293 | A1 | * | 2/2010 | Nicholson ............. A47F 3/0434 49/70 |
| 2012/0038838 | A1 | * | 2/2012 | Nussbacher ...... G02F 1/133308 349/1 |

(Continued)

*Primary Examiner* — Daniel J Rohrhoff
(74) *Attorney, Agent, or Firm* — Laurence A. Greenberg; Werner H. Stemer; Ralph E. Locher

(57) ABSTRACT

A heat insulation door of a refrigeration appliance has a door body with a heat insulation glass module, which includes at least two layers of glass plates disposed with an interval, and a first sealing portion is disposed between the edges of the adjacent glass plates to form an enclosed heat insulation space between the adjacent glass plates; a doorframe surrounds an edge of the heat insulation glass module along a circumferential direction, wherein the doorframe has a rear frame portion located at the back of the heat insulation glass module along a front-to-rear direction of a door, and a door sealing strip is provided at the back of the rear frame portion. Along a direction parallel to the door body, the door sealing strip is at least partially located on an inner side of the first sealing portion located on a same edge.

24 Claims, 3 Drawing Sheets

(56) References Cited

U.S. PATENT DOCUMENTS

| | | | |
|---|---|---|---|
| 2015/0362768 A1* | 12/2015 | Dunn | G02F 1/1339 349/65 |
| 2016/0045038 A1* | 2/2016 | Chubb | A47F 3/0434 312/116 |
| 2016/0166085 A1* | 6/2016 | Twohy | A47F 3/043 62/248 |
| 2018/0164022 A1* | 6/2018 | Ding | E06B 5/00 |
| 2018/0164025 A1* | 6/2018 | Lv | F25D 23/026 |
| 2018/0164031 A1* | 6/2018 | Lee | F25D 23/02 |
| 2018/0238486 A1* | 8/2018 | Jung | F16L 59/065 |

\* cited by examiner

HEAT INSULATION DOOR AND REFRIGERATION APPLIANCE WITH THE HEAT INSULATION DOOR

CROSS-REFERENCE TO RELATED APPLICATION

This application claims the benefit, under 35 U.S.C. § 119, of Chinese patent application CN 201611138455.5, filed Dec. 12, 2016; the prior application is herewith incorporated by reference in its entirety.

BACKGROUND

Technical Field

The present invention relates to the field of refrigeration appliances, in particular to a refrigeration appliance and a heat insulation door thereof.

Related Art

A door of a traditional refrigerator is generally formed by foaming, and a user cannot see the interior of a refrigeration appliance from outside. The refrigeration appliance adopting a heat insulation glass module provides the possibility for the user to observe the interior of a refrigeration space without opening the door. However, if the heat insulation effect of the refrigeration appliance door with the heat insulation glass module is not ideal, condensations are likely to occur on the door.

BRIEF SUMMARY OF THE INVENTION

An objective of the present invention is to provide an improved heat insulation door in order to solve at least one of the technical problems described above.

The present invention provides a heat insulation door for a refrigeration appliance, comprising: a door body having a heat insulation glass module, wherein the heat insulation glass module comprises at least two layers of glass plates disposed with an interval, and a first sealing portion is disposed between the edges of the adjacent glass plates so as to form an enclosed heat insulation space between the adjacent glass plates; a doorframe that surrounds an edge of the heat insulation glass module along a circumferential direction, wherein the doorframe has a rear frame portion located at the back of the heat insulation glass module along a front-to-rear direction of a door, and a door sealing strip is provided at the back of the rear frame portion; and along a direction parallel to the door body, the door sealing strip is at least partially disposed on an inner side of the first sealing portion located on a same edge.

Compared with the prior art, the technical solution of the present invention has the following advantages: the door sealing strip is at least partially disposed on the inner side of the first sealing portion, so that a projection of a refrigeration space in the refrigeration appliance is at least partially staggered to a projection of the first sealing portion in a front-to-rear direction to prevent cold air in the refrigeration space from contacting a sealing edge area with the heat insulation glass module so as to prevent the heat insulation glass module from having the condensation phenomenon at the front side of a sealing area.

Optionally, the first sealing portion is in an annular shape that surrounds the heat insulation glass module; and along the front-to-rear direction, the projection of the door sealing strip is located within the annular shape formed by the projection of the first sealing portion.

Optionally, along a direction parallel to the door body, there is an interval between the door sealing strip and the first sealing portion on a same edge to increase a travel distance of the cold air from the door sealing strip to the first sealing portion so as to reduce the leakage of the cold air.

Optionally, the heat insulation glass module is a vacuum glass module or a hollow glass module.

Optionally, the door body further comprises: a front door panel located in front of the heat insulation glass module and disposed at an interval from the heat insulation glass module; and a second sealing portion is disposed between the heat insulation glass module and the front door panel to form an enclosed heat insulation space between the front door panel and the heat insulation glass module. On one hand, the front door panel can be used for protecting the heat insulation glass module to prevent the heat insulation glass module from being directly exposed to a range that a user can reach, thereby preventing the breaking probability of the front door panel and also preventing the front door panel when being broken from injuring a user. On the other hand, the front door panel can be used as a decoration panel to improve the appearance attractiveness of the heat insulation door.

Optionally, along the front-to-rear direction of the door, projections of the second sealing portion and the first sealing portion on a same edge are at least partially overlapped.

Optionally, along the direction parallel to the door body, the door sealing strip is at least partially located on the inner side of the second sealing portion on a same edge so as to increase a travel distance of the cold air from the refrigeration space to the second sealing portion, thereby reducing the leakage of the cold air.

Optionally, in a width and/or length direction of the door body, the front door panel has a protruding portion that extends out of the edge of the heat insulation glass module. The protruding portion can be used for shielding other parts, for example, can be used for partially or completely shielding the doorframe.

Optionally, the doorframe further comprises: a first cooperative wall located in front of the rear frame portion and at the back of the protruding portion, and connected to the protruding portion; a second cooperative wall disposed at the rear frame portion and facing the heat insulation glass module; a connecting wall that connects the first cooperative wall and the second cooperative wall; and along the front-to-rear direction, the heat insulation glass module is located between the first cooperative wall and the second cooperative wall. Thus, from the cross section of the doorframe, the first cooperative wall, the second cooperative wall and the connecting wall form an approximately-Z-shaped structure.

Optionally, the heat insulation glass module is directly or indirectly connected to the second cooperative wall.

Optionally, the protruding portion completely shields the doorframe along the front-to-rear direction of the door so as to conceal the doorframe.

Optionally, the door body is provided with sealing portions at edges of two adjacent layer structures having an interval, and projections of the sealing portions along the front-to-rear direction are overlapped with each other.

Optionally, the second cooperative wall covers the sealing portion. Thus, when the door sealing strip is disposed at the inner side of the rear frame portion, it can be ensured that the door sealing strip is located on the inner side of each sealing portion.

Optionally, the door body further comprises: a rear protective layer disposed at the back of the heat insulation glass module.

Optionally, the rear protective layer is disposed with an interval from the heat insulation glass module; and a third sealing portion is disposed between the edge of the heat insulation glass module and the edge of the rear protective layer to form an enclosed heat insulation space between the heat insulation glass module and the rear protective layer. The rear protective layer is used for protecting the heat insulation glass module at the back thereof, and the heat insulation effect of the heat insulation door is improved through the heat insulation spaces formed among other heat insulation glass modules.

Optionally, along the direction parallel to the door body, the door sealing strip is at least partially located on the inner side of the third sealing portion on a same edge so as to reduce the leakage of the cold air.

Optionally, along the front-to-rear direction of the door, projections of the third sealing portion and the first sealing portion on a same edge are at least partially overlapped.

Optionally, the rear frame portion comprises at least one enclosed heat insulation cavity; and the heat insulation cavity is located between the door sealing strip and the heat insulation glass module along the front-to-rear direction, or located on an inner side of the door sealing strip along the direction parallel to the door body. The heat insulation cavity can play a role in isolation between the refrigeration space and the door body to prevent the cold air from reaching the door body, thereby improving the heat insulation effect of the heat insulation door.

Optionally, the rear frame portion is provided with a mounting slot for fixing the door sealing strip and a wall for separating the heat insulation cavity from the mounting slot.

Optionally, the rear frame portion and the door body are bonded by using glue, an inner end of the rear frame portion is provided with a bulge on a side facing the heat insulation glass module, and the bulge is pressed on the door body.

Optionally, the heat insulation space is filled with inert gas, and compared with the air, the inert gas has better heat insulation performance.

Optionally, the front door panel is a colorful crystal glass plate, thereby beautifying the appearance.

Optionally, the rear protective layer is a toughened glass plate, a colorful crystal glass plate, or a plastic plate.

Another objective of the present invention is to provide an improved refrigeration appliance, and the refrigeration appliance comprises the heat insulation door of any one described above.

Other features which are considered as characteristic for the invention are set forth in the appended claims.

Although the invention is illustrated and described herein as embodied in a refrigeration appliance, it is nevertheless not intended to be limited to the details shown, since various modifications and structural changes may be made therein without departing from the spirit of the invention and within the scope and range of equivalents of the claims.

DETAILED DESCRIPTION

The foregoing objectives, features and advantages of the present invention will become more apparent from the following detailed description of specific embodiments of the invention in conjunction with the accompanying drawings.

Figure 1:
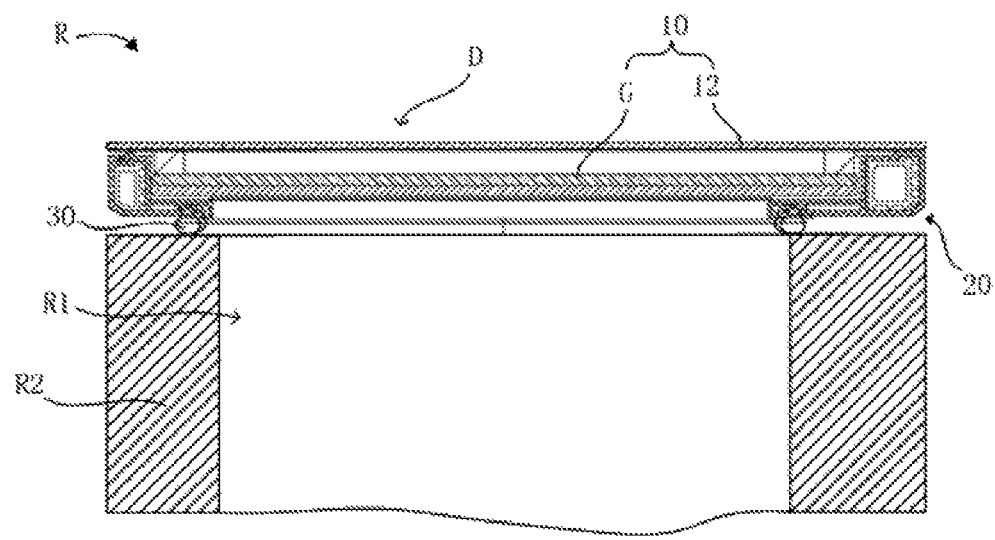
FIG. 1 is a cross-section structural schematic diagram of a refrigeration appliance in embodiments of the present invention.
Figure 2:
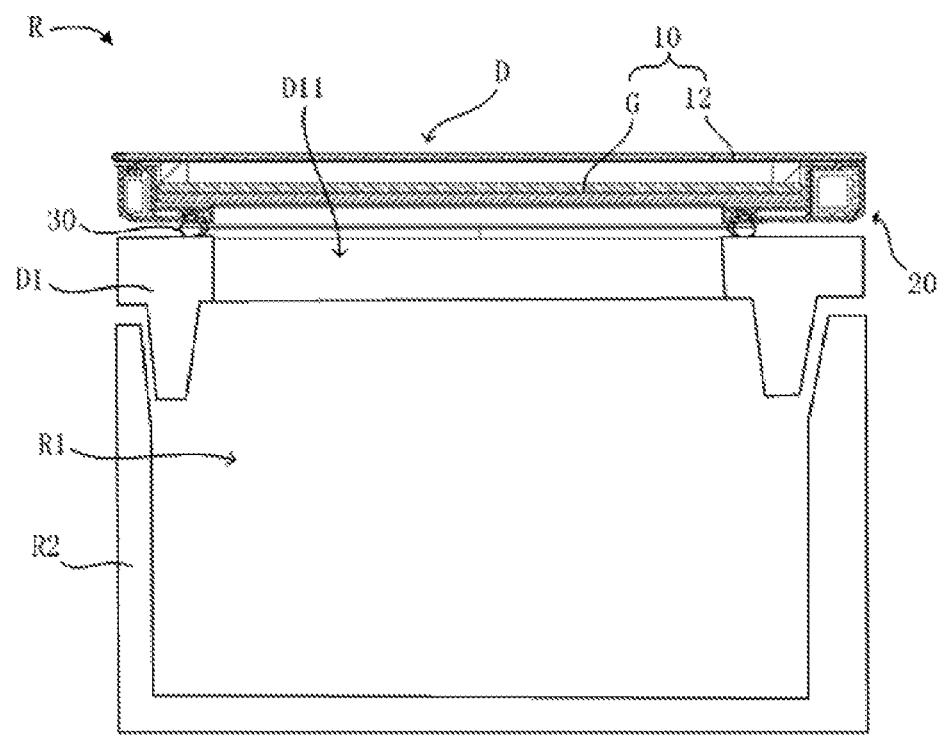
FIG. 2 is a cross-section structural schematic diagram of another refrigeration appliance in embodiments of the present invention.

Referring to FIG. 1 and FIG. 2, the present embodiment provides a refrigeration appliance R and a heat insulation door D for the refrigeration appliance R; and the refrigeration appliance R is provided with a box body R2 comprising a refrigeration space R1, and the heat insulation door D is used for sealing the refrigeration space R1. It shall be understood that the refrigeration appliance R may be a refrigerator but is not limited to the refrigerator, and may also be other appliances with the refrigeration space R1 such as a wine cooler, etc.

The refrigeration space R1 of the refrigeration appliance R may be sealed by a layer of heat insulation door D, as shown in FIG. 1. Or, as shown in FIG. 2, an inner door D1 may also be disposed between the heat insulation door D and the box body R2, the inner door D1 may be provided with an opening D11 facing the heat insulation door D, the opening D11 may be used as an accommodating area for accommodating articles, and the heat insulation door D can rotate relative to the inner door D1 so as to open or close the opening D11.

As shown in FIG. 1 and FIG. 2, the heat insulation door D comprises a door body 10 and a doorframe 20. The door body 10 comprises a heat insulation glass module G, and the doorframe 20 surrounds an edge of the heat insulation glass module G along the circumferential direction. As shown in FIG. 1, the doorframe 20 is in an annular shape that surrounds the heat insulation glass module G, and the heat insulation glass module G is disposed in an annular area formed by the doorframe 20.

Figure 3:
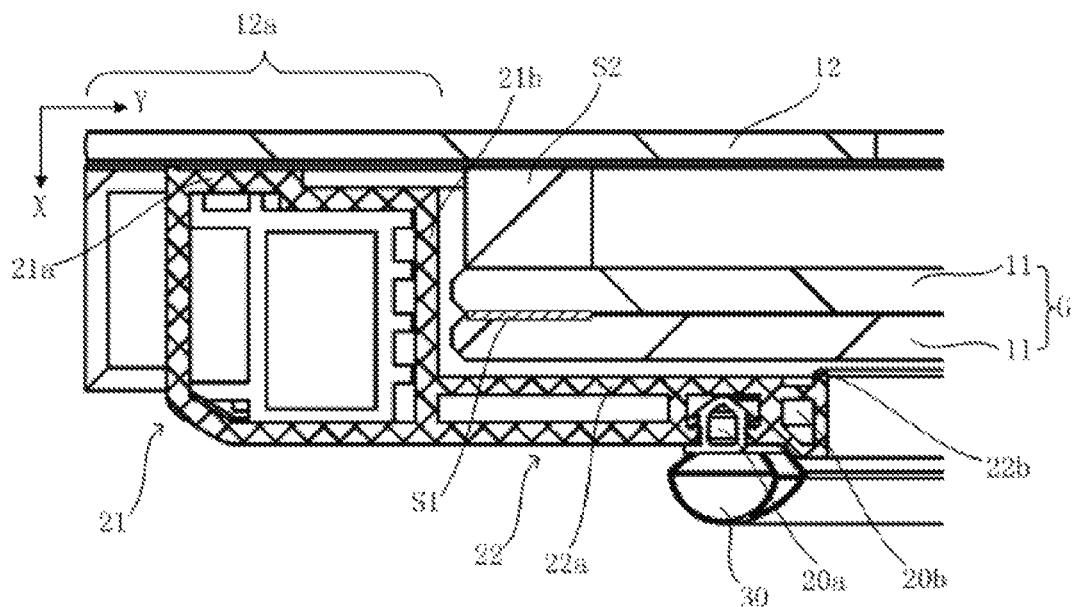
FIG. 3 is a local enlarged diagram of a cross section of a heat insulation door of embodiments of the present invention.
Figure 4:
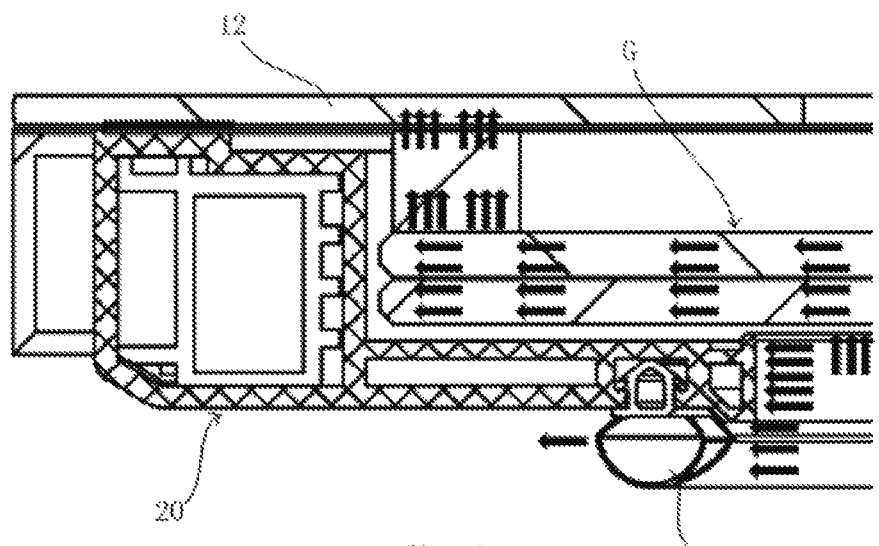
FIG. 4 is cold air flow diagram in the heat insulation door of embodiments of the present invention.

In combination with FIG. 3, FIG. 3 is a cross-section schematic diagram illustrating a local part of one side edge of the heat insulation door D. The heat insulation glass module G comprises at least two layers of glass plates 11 disposed with an interval (i.e., a spacing distance, space), and a first sealing portion S1 is disposed between edges of the adjacent glass plates 11 so as to form an enclosed heat insulation space between the adjacent glass plates 11. Generally speaking, the first sealing portion S1 is in an annular shape that surrounds the edges of the glass plates 11.

As an example, the heat insulation glass module G in the present embodiment comprises two layers of glass plates 11. The heat insulation glass module G may be a vacuum glass module or a hollow glass module, and in the present embodiment, the heat insulation glass module is the vacuum glass module, i.e. the heat insulation space between the two layers of glass plates 11 is a vacuum space.

The doorframe 20 can be divided into a side frame portion 21 and a rear frame portion 22, wherein the side frame portion 21 is located outside a peripheral surface of the heat insulation glass module G, the rear frame portion 22 is located at the back of the heat insulation glass module G along the front-to-rear direction X of the door, and a door sealing strip 30 and a mounting slot 20a for fixing the door sealing strip 30 are disposed at the back of the rear frame portion 22. The door sealing strip 30 is used for sealing between the heat insulation door D and a contact surface thereof in a closed state to prevent the leakage of cold air in the refrigeration space R1 of the refrigeration appliance, and the contact surface may be located in the box body (not shown) of the refrigeration appliance or may also be another door.

Along a direction parallel to the door body 10, i.e. the direction parallel to the heat insulation glass module G (the direction Y in FIG. 3), the door sealing strip 30 is at least partially located on an inner side of the first sealing portion S1 on a same edge.

The door sealing strip 30 and an inner side surface (back surface) of the door body 10 are exposed to the refrigeration space R1 of the refrigeration appliance, part of cold air may be leaked towards the outer side of the door via the door sealing strip 30, and part of cold air may be leaked towards the front of the door via the door body 10. A portion, which is provided with a sealing portion, of the door body 10 is weak in cold air leakage-proof effect, for the heat insulation glass module G, compared with each layer of glass plate 11, the cold air leakage-proof effect of a position on the first sealing portion S1 is weaker. Therefore, if a projection of the first sealing portion S1 is overlapped with a projection of the refrigeration space along a front-to-rear direction X, the cold air in the refrigeration space may be directly leaked along the front-to-rear direction via the first sealing portion S1, thereby leading to the condensation phenomenon of the door body 10 on a front side surface of the first sealing portion S1.

The present solution has the advantages that the door sealing strip 30 is at least partially disposed on the inner side of the first sealing portion S1, so that the projection of the refrigeration space in the refrigeration appliance and the projection of the first sealing portion in the front-to-rear direction are at least partially staggered. As described above, the sealing area is a weak heat insulation area of the heat insulation door, and the way of disposing the door sealing strip 30 at the inner side of the sealing area in the heat insulation glass module G can prevent the cold air in the refrigeration space from contacting a sealing edge area of the heat insulation glass module so as to prevent the heat insulation door from having the condensation phenomenon on the front side of the first sealing portion S1.

It shall be noted that in the present invention, unless otherwise mentioned, the "front-to-rear direction" refers to the front-to-rear direction of the door, i.e. a thickness direction of the door. The "front" is a direction pointing to a front surface of the door, and the "back" is a direction pointing to a back surface of the door. The "inner side" refers to one side, close to the center of the door body, of a plane in which the door body is located, i.e. one side away from the edge of the door.

In the heat insulation glass module G, each edge along the circumferential direction between the adjacent glass plates 11 is required to be sealed, so that the first sealing portion S1 is in an annular shape that surrounds the heat insulation glass module G. Along the front-to-rear direction X, a projection of the door sealing strip 30 is located in the annular shape formed by the projection of the first sealing portion S1.

Preferably, the door sealing strip 30 is completely located on the inner side of the first sealing portion S1. Further preferably, along the direction parallel to the door body 10, there is an interval between the door sealing strip 30 and the first sealing portion S1 on a same edge so as to further reduce the leakage of the cold air.

As shown in FIG. 3, the rear frame portion 22 further comprises at least one enclosed heat insulation cavity 20b. The heat insulation cavity 20b can be located between the door sealing strip 30 and the heat insulation glass module G along the front-to-rear direction X, or located on the inner side of the door sealing strip 30 along the direction parallel to the door body 10. In the embodiment as shown in FIG. 3, the heat insulation cavity 20a is located on the inner side of the door sealing strip 30. The heat insulation cavity 20a can play a role in isolation between the refrigeration space and the door body 10 to prevent the cold air from reaching the door body 10, thereby improving the heat insulation effect of the heat insulation door.

It shall be noted that the mounting slot 20a for mounting the door sealing strip 30 is not communicated with the heat insulation cavity 20b, and the two are separated by a wall.

Referring to FIG. 2 and FIG. 3, the door body 10 further comprises a front door panel 12 located in front of the heat insulation glass module G, and the front door panel 12 is disposed with an interval from the heat insulation glass module G. Thus, on one hand, the front door panel 12 can be used for protecting the heat insulation glass module G to prevent the heat insulation glass module G from being directly exposed to a range that a user can reach, thereby preventing the breaking probability of the front door panel and also preventing the front door panel when being broken from injuring a user. On the other hand, the front door panel 12 can be used as a decoration panel to improve the appearance attractiveness of the heat insulation door.

The front door panel 12 may be a toughened glass plate, a colorful crystal glass plate or a plastic plate, and is preferably the colorful crystal glass plate.

As shown in FIG. 3, a second sealing portion S2 is disposed between the edge of the heat insulation glass module G and the front door panel 12 to form the enclosed heat insulation space between the front door panel 12 and the heat insulation glass module G. The first sealing portion S2 is also basically in an annular shape that surrounds the heat insulation glass module G. In comparison to the intervals among all glass plates 11 in the vacuum heat insulation glass module, the interval between the front door panel 12 and the heat insulation glass module G can be slightly bigger so as to form a hollow space.

It can be seen from FIG. 3 that along the front-to-rear direction of the door, projections of the second sealing portion S2 and the first sealing portion S1 on a same edge are at least partially overlapped.

In order to optimize the cold air leakage-proof effect, along the direction parallel to the door body 10, the door sealing strip 30 is at least partially located on the inner side of the second sealing portion S2 on a same edge so as to reduce the leakage of the cold air.

An area of the front door panel 12 is based on the fact that the heat insulation glass module G is substantially covered, a dimension and a shape of the front door panel 12 may be basically consistent with that of the heat insulation glass module G or may also be greater than that of the heat insulation glass module G.

In the present embodiment, in a width and/or length direction of the door body 10, the front door panel 12 has a protruding portion 12a extending out of an edge of the heat insulation glass module G. The protruding portion 12a can be used for shielding other parts, for example, can be used for partially or completely shielding the doorframe 20. In the present embodiment, along the front-to-rear direction of the door, the protruding portion 12a completely shields the doorframe 20.

Continuously referring to FIG. 3, the doorframe 20 is internally provided with a first cooperative wall 21a located in front of the rear frame portion 22 and at the back of the protruding portion 12a, a second cooperative wall 22a facing the back of the heat insulation glass module G, and a connecting wall 21b that connects the first cooperative wall 21a and the second cooperative wall 22a.

Specifically, the first cooperative wall 21a and the connecting wall 21b are disposed on the side frame portion 21, and the second cooperative wall 22a is disposed on the rear frame portion 22. The connecting wall 21b is located on the inner side of the side frame portion 21 and the outer side of the rear frame portion 22 and surrounds a peripheral edge of the heat insulation glass module G. Along the front-to-rear direction X, the heat insulation glass module G is located between the first cooperative wall 21a and the second cooperative wall 22a. The protruding portion 12a is connected to the first cooperative wall 21a, and the heat insulation glass module G may be directly or indirectly connected to the second cooperative wall 22a.

In the present embodiment, the rear frame portion 22 is bonded with the door body 10 by using glue through the second cooperative wall 22a, the inner end of the rear frame portion 22 is provided with a bulge 22b on one side facing the heat insulation glass module G, and the bulge 22b is pressed on the door body 10 to prevent the leakage of the glue. Or the position of the bulge 22b may be additionally provided with a sealing element or the bulge may be replaced with the sealing element, so as to improve the sealing performance of the refrigeration space.

It shall be noted that besides the heat insulation glass module G and the front protection 12, the door body 10 may further comprise other layer structures which are laminated with the heat insulation glass module G and the front door panel 12. In the door body 10 of a multilayer structure, the edges of two adjacent layer structures having an interval are respectively provided with a sealing portion (the first sealing portion and the second sealing portion as described above and the third sealing portion as described below) so as to form a heat insulation space between two adjacent layer structures, wherein the projections of all sealing portions along the front-to-rear direction X are overlapped with each other. With respect to the door sealing strip 30, in general, the door sealing strip 30 is disposed on the inner side of the rear frame portion 22, the door sealing strip 30 is preferably located on the inner side of each sealing portion, thus the second cooperative wall 22a covers each sealing portion.

It shall be noted that each heat insulation space between the adjacent layer structures may also be vacuumized, or filled with inert gas so as to improve the heat insulation performance.

Figure 5:
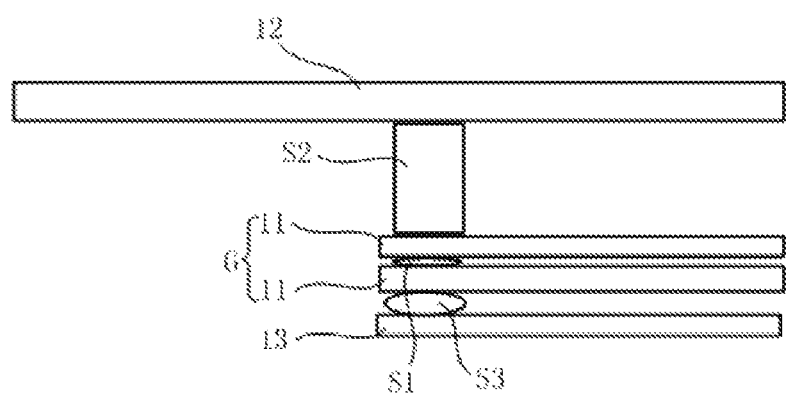
FIG. 5 is a local enlarged diagram of a cross section of a heat insulation door in a variation of embodiments of the present invention.

In other embodiments, referring to FIG. 5, the door body 10 further comprises a rear protective layer 13 disposed at the back of the heat insulation glass module G and disposed with an interval from the heat insulation glass module G. The rear protective layer 13 is used for protecting the heat insulation glass module G at the back and can be used as a decorative layer on the inner side of the heat insulation door D. The rear protective layer 13 may be a toughened glass plate, a colorful crystal glass plate, or a plastic plate.

A third sealing portion S3 is disposed between the edge of the heat insulation glass module G and the edge of the rear protective layer 13 to form an enclosed heat insulation space between the heat insulation glass module G and the rear protective layer 13. Preferably, along the direction parallel to the door body 10, the door sealing strip 30 is at least partially located on the inner side of the third sealing portion S3 on a same edge so as to reduce the leakage of the cold air. As shown in FIG. 5, along the front-to-rear direction X of the door, projections of the third sealing portion S3 and the first sealing portion S1 and the second sealing portion S2 on a same edge are basically overlapped or at least partially overlapped.

Although the present invention is disclosed as above, the present invention is not limited thereto. Various changes and modifications may be made by any technical skilled in the art without departing from the spirit and scope of the present invention, and the protection scope of the present invention shall be defined by the scope of the claims.

The invention claimed is:

1. A heat insulation door for a refrigeration appliance, the heat insulation door comprising:
    a door body having a heat insulation glass module, the heat insulation glass module including at least two glass plates disposed with an interval therebetween, and a first sealing portion being disposed between edges of adjacent glass plates of the at least two glass plates for forming an enclosed heat insulation space between the adjacent glass plates; and
    a doorframe surrounding an edge of the heat insulation glass module along a circumferential direction, the doorframe having a rear frame portion located at the back of the heat insulation glass module along a front-to-rear direction of a door, and a door sealing strip provided at the back of the rear frame portion;
    the door sealing strip, along a direction parallel to the door body, being at least partially located on an inner side of the first sealing portion located on a same edge of the sealing strip.

2. The heat insulation door according to claim 1, wherein the first sealing portion has an annular shape that surrounds the heat insulation glass module; and
    along the front-to-rear direction, a projection of the door sealing strip is located within an annular shape formed by a projection of the first sealing portion.

3. The heat insulation door according to claim 1, wherein along the direction parallel to the door body, there is an interval between the door sealing strip and the first sealing portion located on a same edge of the sealing strip.

4. The heat insulation door according to claim 1, wherein the heat insulation glass module includes at least one of a vacuum glass module or a hollow glass module.

5. The heat insulation door according to claim 1, wherein the door body further comprises:
    a front door panel located in front of the heat insulation glass module disposed with an interval from the heat insulation glass module; and
    a second sealing portion disposed between the edge of the heat insulation glass module and the front door panel to form an enclosed heat insulation space between the front door panel and the heat insulation glass module.

6. The heat insulation door according to claim 5, wherein along the front-to-rear direction of the door, projections of the second sealing portion and a first sealing portion located at a same edge of the second sealing portion are at least partially overlapped.

7. The heat insulation door according to claim 5, wherein along the direction parallel to the door body, the door sealing strip is at least partially located on an inner side of the second sealing portion located on a same edge of the sealing strip.

8. The heat insulation door according to claim 5, wherein in at least one of a width or length direction of the door body, the front door panel has a protruding portion that extends out of the edge of the heat insulation glass module.

9. The heat insulation door according to claim 8, wherein the doorframe includes:
   a first cooperative wall, located in front of the rear frame portion and at the back of the protruding portion, wherein the first cooperative wall is connected to the protruding portion;
   a second cooperative wall, disposed at the rear frame portion facing the heat insulation glass module; and
   a connecting wall that connects the first cooperative wall and the second cooperative wall along the front-to-rear direction, and the heat insulation glass module is located between the first cooperative wall and the second cooperative wall.

10. The heat insulation door according to claim 9, wherein the heat insulation glass module is directly or indirectly connected to the second cooperative wall.

11. The heat insulation door according to claim 9, wherein the protruding portion completely shields the doorframe along the front-to-rear direction of the door.

12. The heat insulation door according to claim 9, wherein the door body is provided with a sealing portion at edges of two adjacent layer structures having an interval, and projections of sealing portions along the front-to-rear direction are overlapped with each other.

13. The heat insulation door according to claim 12, wherein the second cooperative wall covers the sealing portion.

14. The heat insulation door according to claim 5, wherein the front door panel is a colorful crystal glass plate.

15. The heat insulation door according to claim 1, wherein the door body includes: a rear protective layer disposed at the back of the heat insulation glass module.

16. The heat insulation door according to claim 15, wherein:
   the rear protective layer is disposed with an interval from the heat insulation glass module; and
   a third sealing portion is disposed between the edge of the heat insulation glass module and the rear protective layer to form an enclosed heat insulation space between the heat insulation glass module and the rear protective layer.

17. The heat insulation door according to claim 16, wherein, along the direction parallel to the door body, the door sealing strip is at least partially located on an inner side of the third sealing portion located on a same edge of the sealing strip.

18. The heat insulation door according to claim 16, wherein, along the front-to-rear direction of the door, projections of the third sealing portion and a first sealing portion located at a same edge of the second sealing portion are at least partially overlapped.

19. The heat insulation door according to claim 15, wherein the rear protective layer is a toughened glass plate, a glass plate, or a plastic plate.

20. The heat insulation door according to claim 1, wherein the rear frame portion includes at least one enclosed heat insulation cavity; and
   the heat insulation cavity is located between the door sealing strip and the heat insulation glass module along the front-to-rear direction, or is located on an inner side of the door sealing strip along the direction parallel to the door body.

21. The heat insulation door according to claim 20, wherein the rear frame portion is provided with a mounting slot for fixing the door sealing strip and a wall for separating the heat insulation cavity from the mounting slot.

22. The heat insulation door according to claim 1, wherein the rear frame portion and the door body are bonded by glue, an inner end of the rear frame portion is provided with a bulge on a side facing the heat insulation glass module, and the bulge is pressed on the door body.

23. The heat insulation door according to claim 1, wherein the heat insulation space is filled with inert gas.

24. A refrigeration appliance, comprising the heat insulation door according to claim 1.

* * * * *